UNITED STATES PATENT OFFICE.

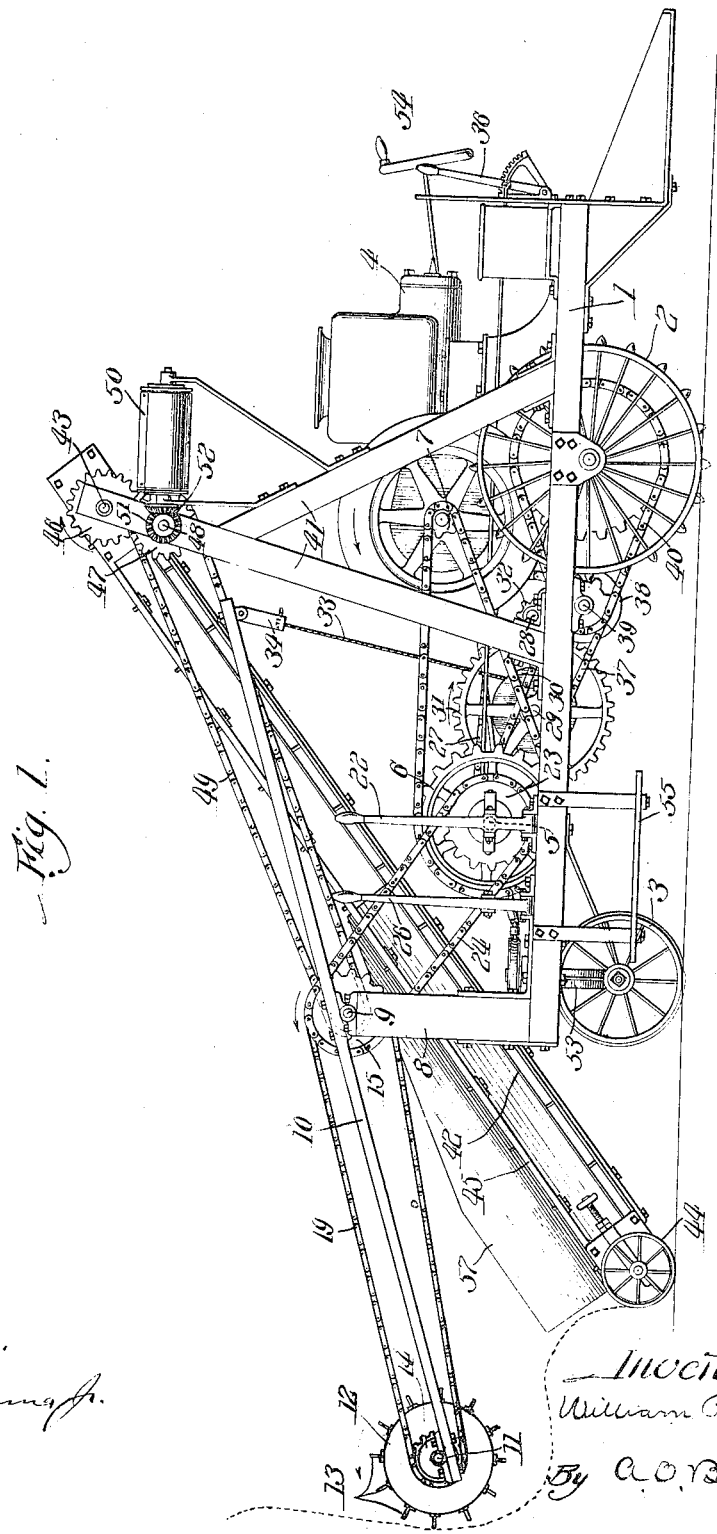

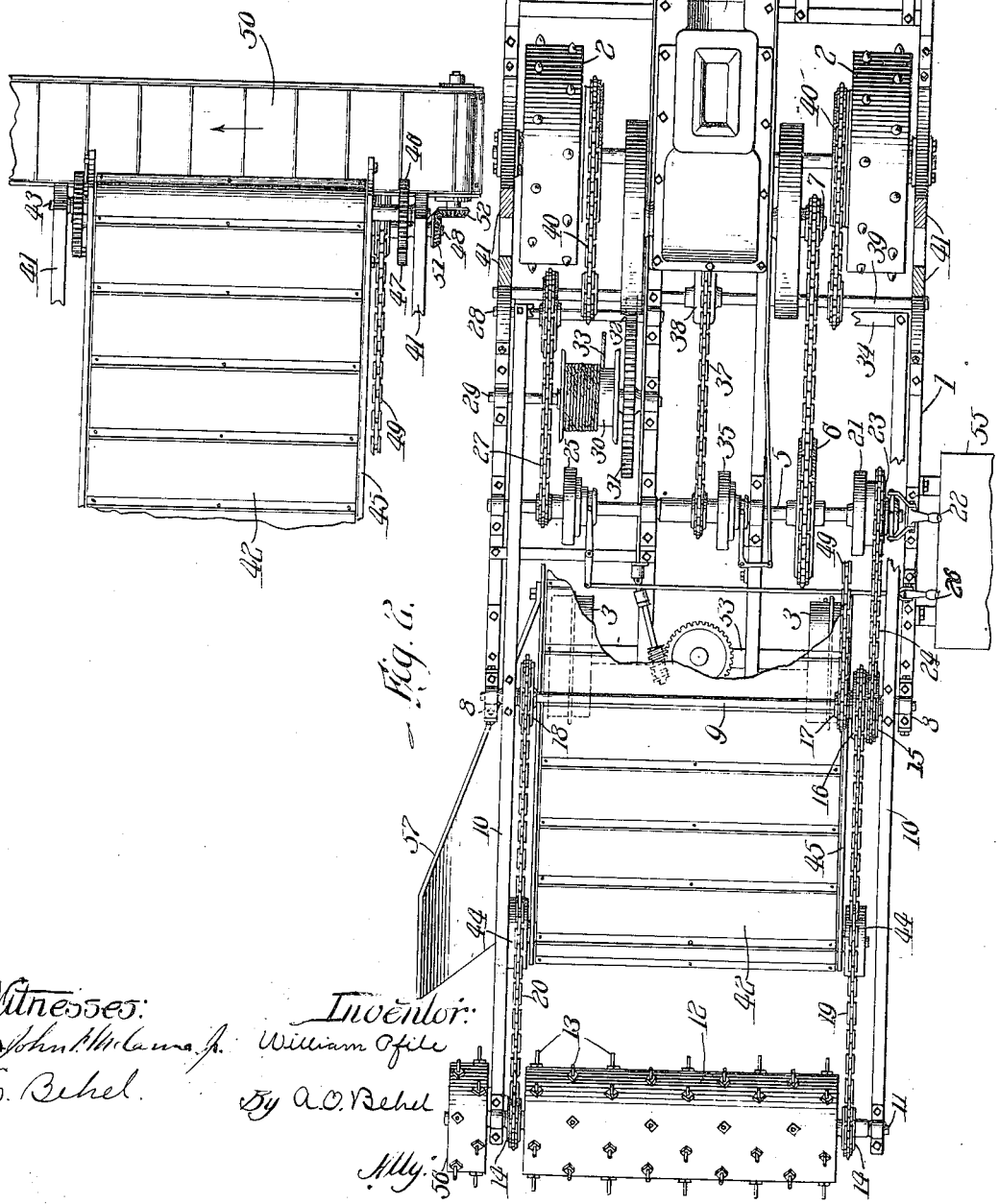

WILLIAM PFILE, OF FREEPORT, ILLINOIS.

MANURE-LOADER.

1,070,065.

Specification of Letters Patent.   Patented Aug. 12, 1913.

Application filed November 19, 1912. Serial No. 732,272.

*To all whom it may concern:*

Be it known that I, WILLIAM PFILE, a citizen of the United States, residing at Freeport, in the county of Stephenson and State of Illinois, have invented certain new and useful Improvements in Manure-Loaders, of which the following is a specification.

The object of this invention is to construct a manure loader for the purpose of gathering and conveying manure from the ground to a wagon.

A further object is to construct the loader so that it can be moved by its own power and as it is in motion, to gather the manure from its bed, thus cutting a path through the bed, the repetition of this action finally disposing of the entire bed of manure.

In the accompanying drawings: Figure 1 is a side elevation of the loader. Fig. 2 is a plan view of the loader, the upper part of the elevating-carrier and the cross-carrier not being shown. Fig. 3 is a plan view of the upper portion of the elevating-carrier and the cross-carrier.

The truck frame 1, carried by the traction wheels 2 and front wheels 3, has mounted upon it a suitable engine 4, for furnishing power.

A transverse shaft 5 is carried by the frame 1 and has fixedly secured thereto a sprocket-wheel 6 having a chain drive to the sprocket-wheel 7 on the engine shaft; the shaft 5 being constantly driven while the loader is in operation.

Carried at the forward end of the frame are two vertical posts 8 which support a shaft 9. Pivoted to the shaft 9 are two rocking bars 10, which carry at their forward end a shaft 11. Mounted on the shaft 11 is a cylinder 12 which has attached to its peripherial face a plurality of extending teeth 13 of suitable construction and being suitably spaced. Fixedly secured to each end of the cylinder 12 are the sprocket-wheels 14, and fixedly secured to shaft 9 are the sprocket-wheels 15, 16, 17 and 18, the sprocket-wheels 14, 16 and 14, 18 being connected by the chain drives 19 and 20 respectively. A suitable friction clutch 21 mounted on shaft 5 and operated by lever 22, has a sprocket-wheel 23 carried by its loose member, said sprocket-wheel having a driving chain connection 24 with the sprocket-wheel 15.

A friction clutch 25, mounted on shaft 5 and controlled by lever 26, has a chain drive 27 with the counter shaft 28. A shaft 29, carried by the frame, fixedly carries a drum 30 and spur gear 31, said spur-gear meshing with a spur-pinion 32 fixedly secured to shaft 28. The cable 33, carried by the drum, has a connection with the yoked bar 34, said bar being pivoted to the free end of the rocking bars 10 and being formed yoked so that when the cylinder 12 is lowered, the said bar 34 will not interfere with the elevating-carrier.

The friction clutch 35, mounted on shaft 5 and operated by the lever 36 at the rear of the loader, has a chain drive 37 with the differential-gear 38 carried by the drive-shaft 39, said drive-shaft being carried by the frame. The traction wheels 2 are driven by the endless-chains 40, from the drive-shaft 39.

The shaft 43 carried by the upright bars 41, forms a pivotal support for the elevating-frame 45, which carries at its lower end the carrying wheels 44, capable of longitudinal adjustment with respect to the frame 45. The endless conveyer 42 is driven from shaft 43, and shaft 43 is driven through the means of spur-gear 46 fixedly secured thereto and spur-gear 47 fixedly secured to the shaft 48. The shaft 48 has a chain drive 49 with the sprocket-wheel 17 on the shaft 9.

A cross-conveyer 50, supported by the uprights 41, is driven through means of bevel-gears 51, 52, bevel-gear 51 being fixedly secured to the shaft 48; said conveyer being adapted to convey the manure deposited thereon by the elevating-conveyer, to a wagon which is drawn alongside of the loader.

The front wheel support 53 is pivotally connected to the frame and is turned by a worm and gear which is operated by the hand wheel 54.

The operation of the loader is as follows: With the shaft 5 being constantly driven by the engine, an operator standing on the step 55, by actuating the lever 22, causes the cylinder 12 to be rotated in the direction indicated by the arrow adjacent thereto, through the means of clutch 21, chains 24, 19 and 20. This operation also puts in motion the elevating and cross-conveyers; the elevating-conveyer through the means of chains 24 and 49, and gears 47 and 46, the cross-conveyer being driven in the direction of the arrow thereon, by the bevel-gears 51 and 52. By actuating the lever 26 the drum 30 is rotated in the direction of the arrow adjacent thereto, through the means of clutch 25, chain 27 and spur-gears 31 and 32. It will be seen that this action winds the cable 33 upon the drum, thereby rocking the bars 10 and raising the cylinder 12. By letting the clutch slip the weight of the cylinder will cause the cylinder to fall and thus the down feed of the cylinder can be varied to suit the requirements. The operator on the rear step, by actuating the lever 36, causes traction to be applied to the wheels 2 through means of clutch 35, chain 37 leading to the differential-gear and chains 40. When the cylinder is revolving, the teeth thereon gather the manure and throw it onto the elevating-conveyer, which in turn deposits it upon the cross-conveyer which carries it to the side of the loader, depositing it in a wagon drawn alongside of the loader.

It will be seen that with a loader of this novel construction, that manure in the pile or as it accumulates in the barn yard, can be easily and quickly gathered and conveyed to wagons, the vertical range of the cylinder allowing it to operate at the various heights desired, and the elevating-conveyer by coming in close proximity with the ground, gathers the manure that is not thrown upon the elevating-conveyer by the cylinder, thus making a clean path where the manure is being gathered.

Mounted on shaft 11, outside of the bar 10, is the narrow cylinder 56, which revolves with the cylinder 12, and is adapted when cutting into a bank of manure, to make a clearance for the side of the gathering frame, which frame would not have a free movement if it were not for this auxiliary cylinder. The apron 57 carried by the elevating frame 45, guides the manure thrown upon it by the cylinder 56, to the elevating carrier.

I claim as my invention:

A manure loader comprising a truck, a driving mechanism carried thereby, a stationary standard carried by the truck adjacent the rear end of same and extending thereabove, an elevating conveyer frame disposed longitudinally above the truck, having its upper end pivotally supported by said stationary standard, its lower end overreaching the forward end of the truck and having carrying wheels resting upon the ground whereby said conveyer frame will be swung vertically from its pivotal support by the rise and fall of its wheeled end passing over irregular ground, a conveyer for said frame, a manure gathering frame pivotally supported by the truck above said conveyer frame and having one end thereof extending forwardly over the lower end of the said conveyer frame, a gathering cylinder carried by the free end of the gathering frame and disposed beyond the wheeled end of the conveyer frame whereby when said gathering frame is swung vertically its gathering cylinder will be swung in a vertical range, the lower movement thereof being within a close proximity of the ground and the end of the conveyer frame, the gathering cylinder adapted to deposit manure gathered thereby during its vertical range of movement, upon said elevating conveyer, and a driving connection between said driving mechanism and the elevating conveyer and gathering cylinder.

In testimony whereof I have hereunto set my hand in presence of two subscribing witnesses.

WILLIAM PFILE.

Witnesses:
CARRIE G. NILES,
HAROLD D. POWER.